United States Patent [19]

Sugimori et al.

[11] Patent Number: 5,327,236
[45] Date of Patent: Jul. 5, 1994

[54] VIDEO SWITCHER APPARATUS FOR WIDE SCREEN EDTV SIGNALS

[75] Inventors: Yoshio Sugimori; Yoshihide Kimata, both of Tokyo, Japan

[73] Assignee: Nippon Television Network Corporation, Tokyo, Japan

[21] Appl. No.: 862,974

[22] Filed: Apr. 3, 1992

[30] Foreign Application Priority Data

Jul. 25, 1991 [JP] Japan ................... 3-186087

[51] Int. Cl.$^5$ .................. H04N 7/04; H04N 5/268
[52] U.S. Cl. ....................... 348/495; 348/386; 348/460
[58] Field of Search ............. 358/183, 181, 182, 180, 358/160, 22, 141, 142, 133, 12, 147; H04N 5/262, 5/272, 7/04, 7/08, 5/268

[56] References Cited

U.S. PATENT DOCUMENTS

| | | | |
|---|---|---|---|
| 4,772,949 | 9/1988 | Nadan | 358/141 |
| 4,959,717 | 9/1990 | Faroudja | 358/141 |
| 4,975,771 | 12/1990 | Kassatly | 358/181 |
| 5,138,455 | 8/1992 | Okumura et al. | 358/181 |

Primary Examiner—James J. Groody
Assistant Examiner—Michael H. Lee
Attorney, Agent, or Firm—Dellett and Walters

[57] ABSTRACT

A compatible special effect signal can be produced without using an encoder or a special signal processor. Each of EDTV signals is divided into a main screen signal and a compensation screen signal. Compensation screen modification circuits modify the special position and size of the compensation screen signals such that the compensation screen signals match with the main screen signals in spacial position and size. The modified signals and the main screen signals are multiplexed in a frequency domain. The multiplexed signals are gated in response to a wipe signal and the gated signals are mixed with each other. The mixed signal is separated into the main screen signal and the compensation screen signal in the frequency domain. A compensation screen signal restorer circuit converts the frequency separated compensation screen signal into the original compensation signal which is mixed with the main screen signal to generate the wiped wide screen EDTV signal.

6 Claims, 12 Drawing Sheets

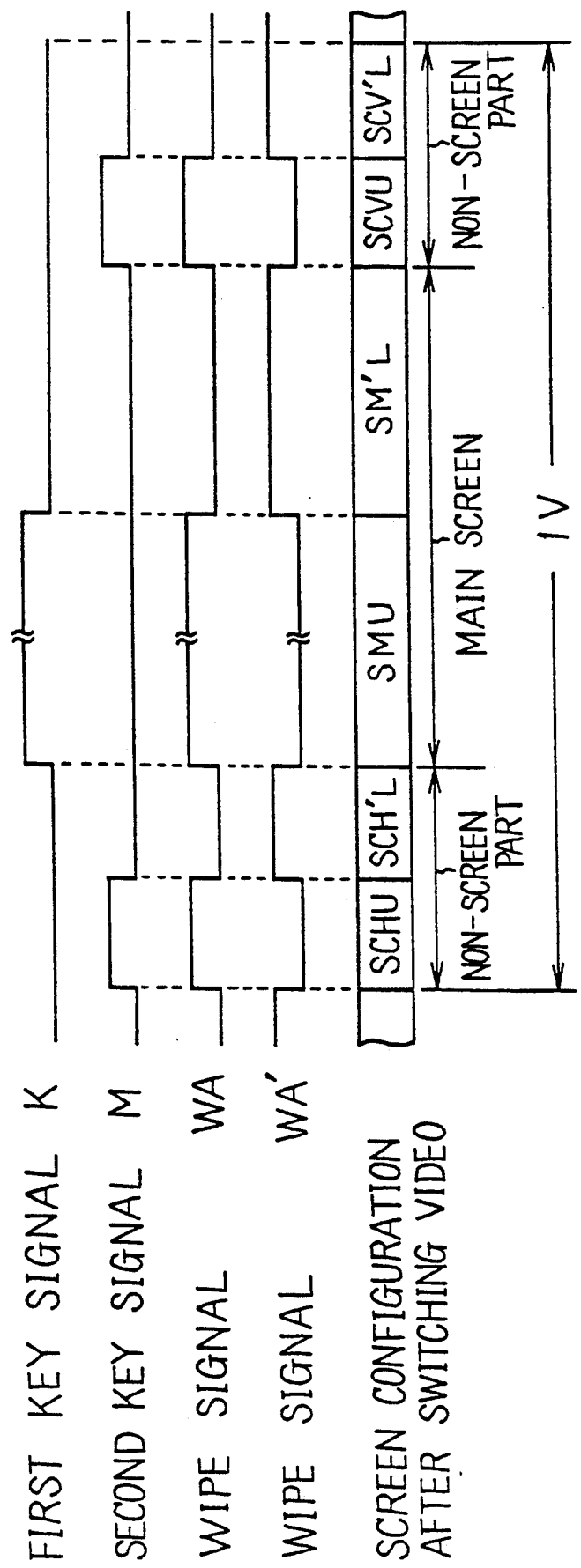

HORIZONTAL WIPE

VERTICAL WIPE

VIDEO SWITCHER APPARATUS FOR WIDE SCREEN EDTV SIGNALS

BACKGROUND OF THE INVENTION

The present invention relates to a video switcher apparatus proper for a video display apparatus of displaying wide screen EDTV signals on a screen.

A screen configuration ratio (aspect ratio) of a current type television signal is 4:3 as shown in FIG. 9A. The Extended Definition TV (EDTV) system is in the spotlight recently as a television system which is able to reproduce a detailed image or a high definition image. A non-interlace scanning method having 525 horizontal scanning lines is applied to the EDTV system.

A wide screen type EDTV will next enter the spotlight as a next age of the EDTV system. This type employs non-interlace scanning having 525 horizontal raster lines similar to the current EDTV system. The screen aspect ratio will be 16:9 in a manner similar to a high definition television (HDTV) system.

It is difficult to accomplish a compatibility between a current type television signal and the wide screen type EDTV signal because their aspect ratios are different from one another. However, a so-called letter box system is proposed for the wide screen type EDTV signal as one method to accomplish compatibility.

According to the letter box system, if an image of 16:9 aspect ratio is reproduced on a screen of 4:3 aspect ratio, upper and lower screen areas become non-image areas as shown in FIG. 9C. In this drawing, slant line areas represent the non-image areas.

It is assumed that a main screen SM represents a common screen area to both the screens having different aspect ratios and a main screen signal (represented by SM) is displayed on the main screen area SM. In this instance, it is desired for the wide screen type EDTV signal that a relatively low frequency component of the wide screen type EDTV signal be assigned to the main screen signal SM and horizontal and vertical high frequency components (for the high resolution display) be assigned to a compensation screen signal SC. Then, the compensation screen signal forms non-image areas 1 and 2 as shown in FIG. 9C.

The compensation screen signal is used only for the EDTV receiver. The high definition image is reproduced by both the compensation screen signal and the main screen signal. The main screen signal can be used as the television signal by a conventional receiver. The upper and lower non-image areas 1 and 2 are accomplished by applying the wide screen type EDTV signal to the conventional receiver. If the compensation screen signal is inserted into the upper and lower non-image areas 1 and 2, the wide screen type EDTV video signal would be reproduced by the conventional receiver. It should be noted that the compensation screen signal is unnecessary for the conventional receiver because it is not used to produce an image. Thus, compatibility can be established between the wide type EDTV signal and the current TV signal.

Thus, the wide screen type EDTV signal may be converted into a format such that the main screen signal SM is positioned at the center portion of the raster and the compensation screen signal SC is positioned at the upper and lower non-image areas. Then, the converted signal may be transmitted.

The compensation screen signal includes high frequency components or the like along the horizontal and vertical directions, and these components act as a high frequency compensation signal. In this instance, for example, the horizontal compensation screen signal SCH is inserted into the upper non-image area 1 and the vertical compensation screen signal SCV is inserted into the lower non-image area 2.

Each of the compensation signals may be separated and inserted into the upper and lower non-image areas. As shown in FIG. 10, each of the non-image areas 1 and 2 may be separated by two horizontally. Moreover, the horizontal compensation screen signal SCH and the vertical compensation screen signal SCV may be separated and inserted into the non-image areas.

When the compensation screen signal is inserted, it is compressed horizontally or vertically and then inserted. Since a horizontal line number of the non-image areas to which the compensation screen signal is inserted is about one third of the horizontal line number of the main screen area, one horizontal line of the compensation screen signal corresponds to three horizontal lines of the main image signal. If the compensation screen signal is not compressed, the more non-image area is required.

The transmitted wide screen type EDTV signal can be displayed on the conventional receiver by processing the signal as discussed hereinbefore. On the other hand, the wide CRT type special receiver can display the wide screen type EDTV signal in the high definition mode by using the compensation screen signal.

If many video cameras outputting the wide screen type EDTV signals are used in a broadcasting station, it is necessary to switch the outputs from the many video cameras. The output switching operation is done for switching the video cameras as well as accomplishing special effects, such as a wipe operation.

Examples of the special effects are shown in FIGS. 11a, 11, 11b and 11c. A horizontal wipe image (FIG. 11b) or a vertical wipe image (FIG. 11c) is obtained by using an image of a camera A (FIG. 11a) and an image of a camera B (FIG. 11a').

A video switcher apparatus shown in FIG. 12 may be proposed to be used in this instance. This drawing is a block diagram of a two-channel video switcher apparatus for switching two cameras wherein, for example, a terminal 11 receives the wide screen EDTV signal "a" of FIG. 11a and a terminal 12 receives the wide screen EDTV signal "a". Reference numbers 13 and 14 represent gate circuits each of which executes a complement gate process in response to a wipe signal (key signal) applied to a terminal 15. A mixer 6 mixes the wiped wide screen EDTV signals with each other and applies the wiped EDTV signal "b" or "c" shown in FIG. 11b or 11c to a terminal 17.

In order to make the switching operation proper, the input signals "a" and "a'" should match with the wipe signal in spacial position.

As discussed hereinbefore, the wide screen EDTV signal is formed by inserting the compensation screen signal SC and the main screen signal SM into the raster in which the spacial position relationship therebetween is modified. Since the main screen signal SM and the compensation screen signal SC are wiped simultaneously, the screen is divided into, for example, the left half screen and the right half screen when the horizontal wipe is accomplished.

There is no special problem in the main screen. However, the high frequency components in the main screen signal SM of the left half L of the screen shown in FIG. 11b cannot be compensated only by the compensation screen signal SC in the left half L. Similarly, the high frequency components in the main screen signal SM of the right half R cannot be compensated only by the compensation screen signal SC in the right half.

The reason is that the compensation screen signal can be inserted such that the high frequency components of the main screen signal can be compensated if the compensation screen signal inserted into all the non-image screen portions 1 and 2 is used. If a compression process is accomplished, the high frequency compensation signal is unstable and this signal cannot be employed effectively.

There is a problem in the vertical wipe operation. As shown in FIG. 11c, the compensation screen signal in the upper screen U consists only of the horizontal high frequency components in the main screen of the upper screen U after the wipe operation is finished. After the wipe operation, the compensation screen signal in the lower screen L consists only of the vertical high frequency component in the main screen of the lower screen L. Thus, the resultant signal is completely different from the ideal signal.

These problems occur when the screen insertion position of the compensation screen signal has no relation to that of the main screen signal.

In order to resolve these problems, EDTV decoders could be provided at the input terminal of the video switcher apparatus, the number of the EDTV decoders should be the same as that of the inputs, the main screen signal and the compensation screen signal should be mixed to produce a single EDTV signal, and then the video signal switching process should be done. In other words, the high resolution wide screen would be restored once.

The above discussed construction needs many decoders at the input side of the video switcher apparatus and is very expensive. In the broadcasting station, since video switcher apparatuses are apt to be connected in cascade, the discussed construction is not practical.

The decoded EDTV signal is generally of the line sequence type because of the high quality image of the EDTV signal. Thus, the video switcher apparatus receiving the decoded signal should be the line sequence type. As a result, it is impossible to use the current type apparatus and the cost performance of the discussed apparatus is not acceptable.

What is desired is a video switcher apparatus that resolves the above discussed problems and can avoid an improper video switching operation without using a decoder or the like.

SUMMARY OF THE INVENTION

According to a video switcher apparatus of the present invention, that processes a plurality of wide screen EDTV signals, the EDTV signal consists of a main screen signal and a compensation screen signal for high frequency compensation of the main screen. This compensation screen signal is inserted into a non-image area of a screen on which an image of the wide screen EDTV signal is displayed, an aspect ratio of the display screen being different from that of the image of the wide screen EDTV signal. After the display position of the main screen signal matches that of the compensation screen signal, a video signal switching operation may be done.

Signal separator circuits separate input EDTV signals into main screen signals and compensation screen signals. Compensation image modification circuits modify the spacial position and size of the compensation screen signals. As a result, the compensation screen signals are reproduced at the same spacial position as the main screen, and the sizes of the compensation and main screen images are equal to each other.

Frequency multiplex circuits multiplex the frequencies of the modified compensation screen signal and the main screen signal. The multiplexed signals are gated in response to a wipe signal, and a mixer mixes the gated signals. An additional frequency separator circuit separates the mixed signal in the frequency domain into a main screen signal and a compensation screen signal, and a compensation screen signal restorer circuit restores the frequency separated compensation screen signal to the original compensation screen signal. An additional mixer mixes this compensation screen signal and the main screen signal to produce a wiped wide screen EDTV signal.

Thus, this invention processes the signals under the condition that the special positions of the input signals (main and compensation screen signals) to be switched and the wipe signal are matched with each other, so that the desired special effect signal can be generated without using a decoder or the like.

The present invention is pointed out with particularly in the appended claims. Objects and advantages of the present invention will become apparent to those having ordinary skill in the art when taken in conjunction with the accompanying drawings.

DRAWINGS

FIG. 8 shows a timing diagram for explaining the video switching operation;

DETAILED DESCRIPTION OF THE INVENTION

Preferred embodiments of the video switcher apparatus for the wide screen EDTV signals according to the present invention will be discussed by reference to the attached drawings which show a two-channel switching operation.

Figure 1:
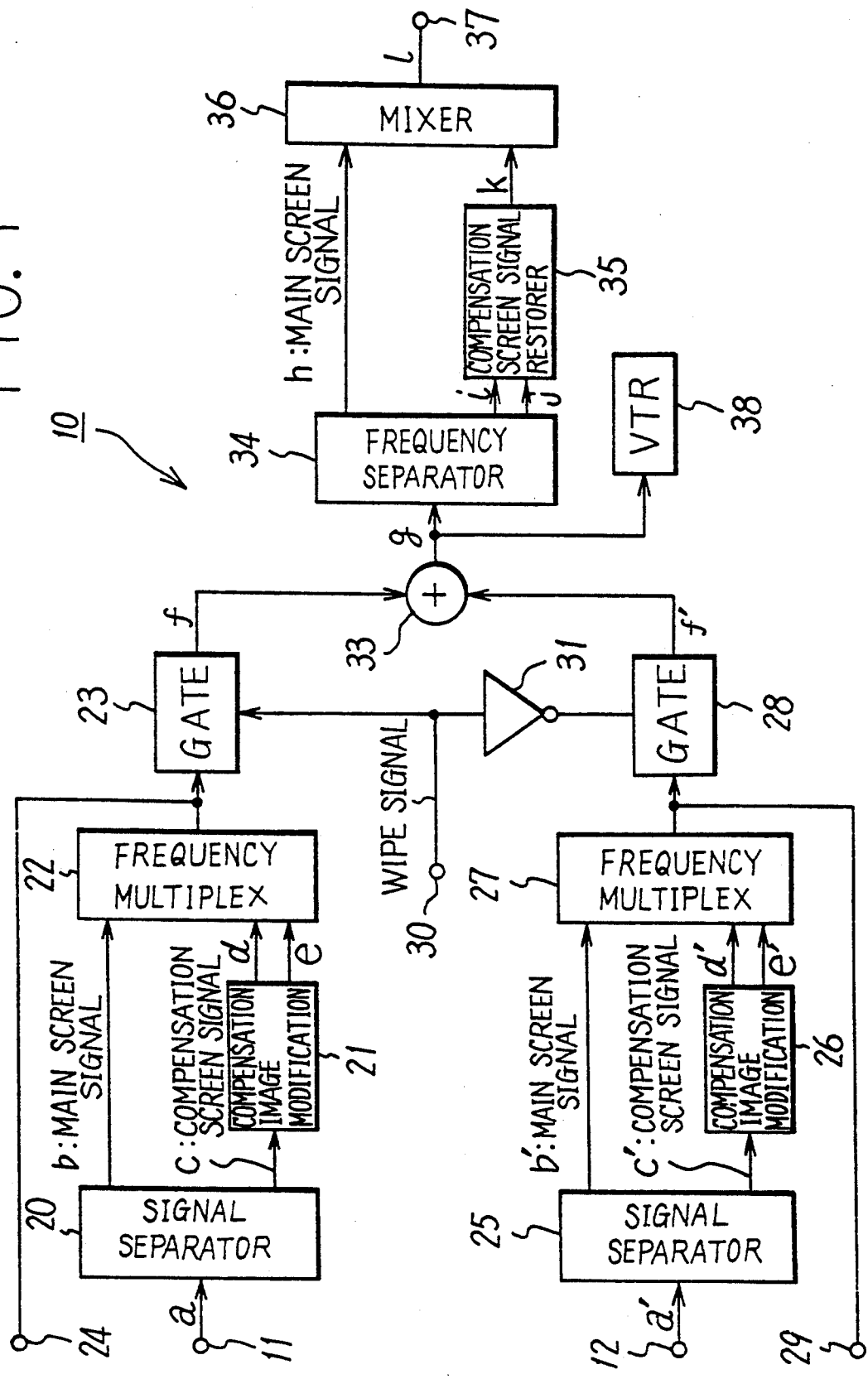
FIG. 1 shows a block diagram of one embodiment of a video switcher apparatus for wide screen EDTV signals according to the present invention.

FIG. 1 shows one embodiment of the video switcher apparatus according to the present invention. A wide screen EDTV signal to be processed is such that an output screen signal SM is positioned on a center portion of a raster and a compensation screen signal SC is assigned to non-image areas 1 and 2 positioned at upper and lower sides of the raster area. In other words, the signal to be processed is a letter box type television signal.

The embodiment of the invention shown in FIG. 1 matches a special position of an image compensation signal of an input wide screen EDTV signal with that of a main screen signal and executes the video switching operation in order to make display positions of the main and compensation screen signals equal to each other.

Figure 2:
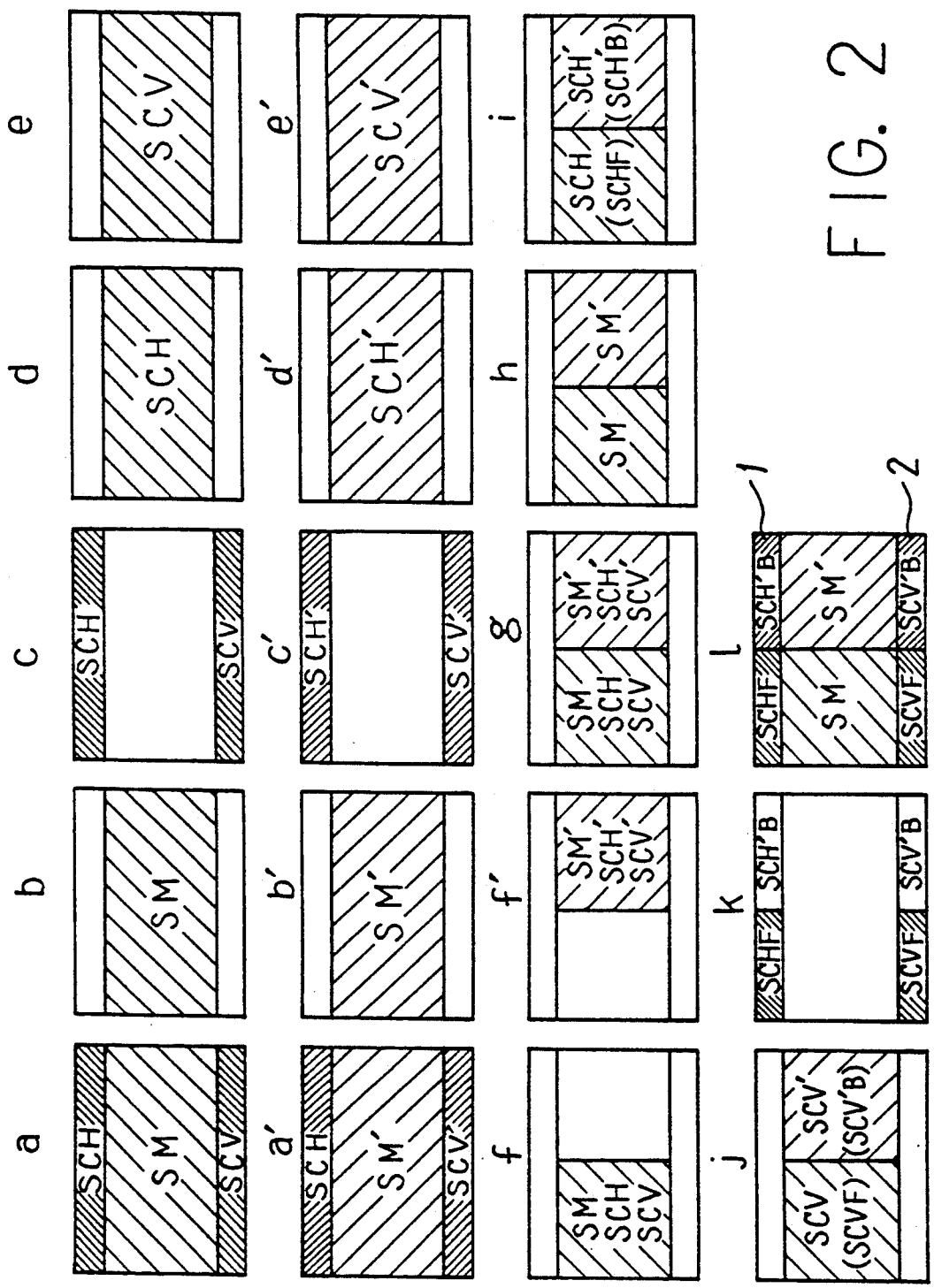
FIG. 2 shows screens for explaining a video switching operation.

This embodiment will be discussed by reference to video switching models shown in FIG. 2. In order to understand this embodiment easily, screen references "a", "b", "c" ... in FIG. 2 represent the screens based on signals having the same references in FIG. 1. In FIG. 2, an oblique line area (right-up or left-up oblique line area) represents an area in which the signal exists or an image is displayed.

A terminal 11 receives the wide screen EDTV signal "a". The wide screen consists of the main screen and the compensation screen. The main screen is positioned at the center of the screen in response to the main screen signal SM. The compensation screen is positioned at the upper and lower side of the center screen for compensating high frequency components in response to the compensation screen signals SC (SCH and SCV).

The compensation signals are displayed as discussed hereinbefore only when displaying on the current type screen having the aspect ratio of 4:3. When using a wide screen having the aspect ratio of 16:9, the high frequency compensation signal is inserted into the main screen signal to obtain the high resolution screen display. In the case of the current type screen, the compensation screen may be, for example, a gray or black display screen in order to prevent the compensation screen from being an eyesore.

A signal separator circuit 20 separates the EDTV signal into the main screen signal "b" and the compensation screen signal "c". A compensation image modification circuit 21 modifies a spacial position and a size of the compensation screen signal such that a display position of the image based on the compensation screen signal matches that of the main screen. Thus, the circuit 21 produces horizontal and vertical compensation screen signals "d" and "e" whose spacial positions and sizes match the display position.

Figure 3:
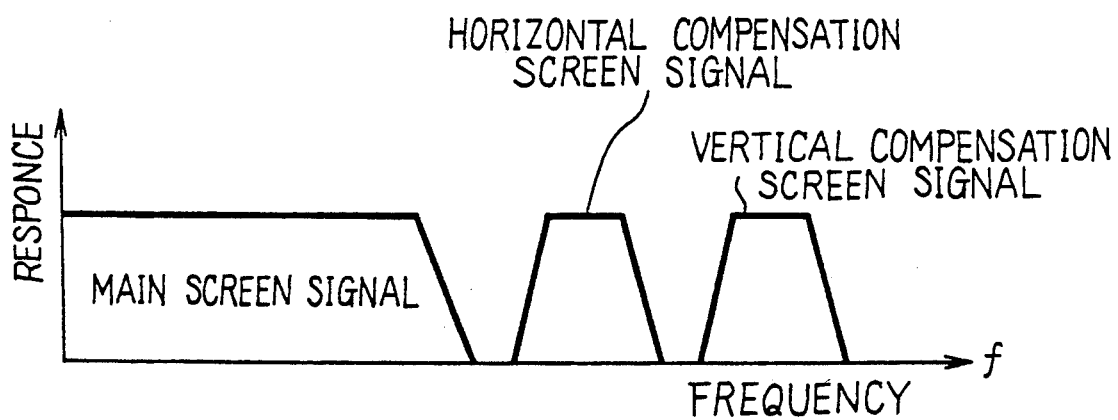
FIG. 3 shows one example of a frequency multiplex spectrum.

A frequency multiplex circuit 22 multiplexes frequencies of the horizontal compensation screen signal "d", the vertical compensation screen signal "e" and the main screen signal "b". An example of this frequency multiplexing is shown in FIG. 3.

Another channel is similar to the first channel. A signal separator circuit 25 separates a main screen signal "b'" from a wide screen EDTV signal "a'" at a terminal 12. A compensation image modification circuit 26 produces a horizontal compensation screen signal "d'" and a vertical compensation screen signal "e'". These signals are multiplexed in the frequency domain by a frequency multiplex circuit 27.

Gate circuits 23 and 28 gate the frequency multiplexed EDTV signals in response to a wipe signal at a terminal 30. In a case of FIG. 2 wherein a horizontal wipe operation is shown, the gate circuits 23 and 28 execute the complementary gate process. Thus, the gate circuit 28 receives the wipe signal through an inverter 31. As a result, the gate circuit 23 generates the wipe EDTV signal "f" and the gate circuit 28 generates the wipe EDTV signal "f'".

A mixer 33 mixes these wipe EDTV signals "f" and "f'" to produce a mixed EDTV signal "g". A frequency separator circuit 34 separates the mixed EDTV signal "g" into a mixed main screen signal "h", a mixed horizontal compensation screen signal "i" and a mixed vertical compensation screen signal "j".

Since the mixed main screen signal "h" is formed by mixing the main screen signals SM and SM' after the wipe operation, the image based on the main screen signal SM is assigned to the left half of the screen and the image based on the main screen signal SM' is assigned to the right half as shown in FIG. 2h.

The mixed horizontal compensation screen signal "i" consists of the wiped horizontal compensation screen signal SCH and SCH'. Thus, as shown in FIG. 2i, the left half of the screen is occupied by the high frequency compensation screen based on the left half horizontal compensation screen signal (SCHF) of the horizontal compensation screen signal SCH. The right half of the screen is occupied by the high frequency compensation screen based on the right half horizontal compensation screen signal (SCH'B) of the horizontal compensation screen signal SCH'.

Similarly, the mixed vertical compensation screen signal "j" consists of the wiped vertical compensation screen signal SCV and SCV'. Thus, as shown in FIG. 2j, the left half of the screen is occupied by the high frequency compensation screen based on the left half vertical compensation screen signal (SCVF) of the vertical compensation screen signal SCV. The right half of the screen is occupied by the high frequency compensation screen based on the right half vertical compensation screen signal (SCV'B) of the vertical compensation screen signal SCV'.

A compensation screen signal restorer circuit 35 receives the mixed horizontal compensation screen signal "i" and the mixed vertical compensation screen signal "j". This circuit 35 further restores the output signal "k" whose signal type is the same as the input signal. This compensation screen signal "k" is inserted into the non-image areas 1 and 2 upper and lower with respect to the main screen because of the reconversion.

A signal mixer circuit 36 mixes the compensation screen signal "k" with the mixed main screen signal "h" as shown in FIG. 2 to output the wiped EDTV signal "l" at a terminal 37.

As being understood from the final EDTV signal "l", all the signal components based on the EDTV signal "a" exist in the left half of the screen. In other words, the main screen based on the main screen signal SM is positioned at the center portion of the screen. Moreover, the compensation screen signals SCHF and SCVF for the horizontal and vertical high frequency compensation are positioned at the upper and lower non-image areas 1 and 2. The compensation screen signals SCHF and SCVF have relation to the left half of the main screen.

Similarly, all the signal components based on the EDTV signal "a'" exists in the right half of the screen.

In other words, the main screen based on the main screen signal SM' is positioned at the center portion of the screen. In addition, the compensation screen signals SCH'B and SCV'B for the horizontal and vertical high frequency compensation are positioned at the upper and lower non-image areas. The compensation screen signals SCHB and SCV'B have relation to the right half of the main screen.

As a result, the wiped left and right half images can be displayed on the wide screen under the high resolution condition, and only the main screen can be displayed on the current type screen.

In FIG. 1, the frequency multiplexed EDTV signal may be recorded by a VTR 38 or the like. Input terminals 24 and 29 receive external EDTV signals whose signal type is the same as the frequency multiplexed signal.

Figure 4:
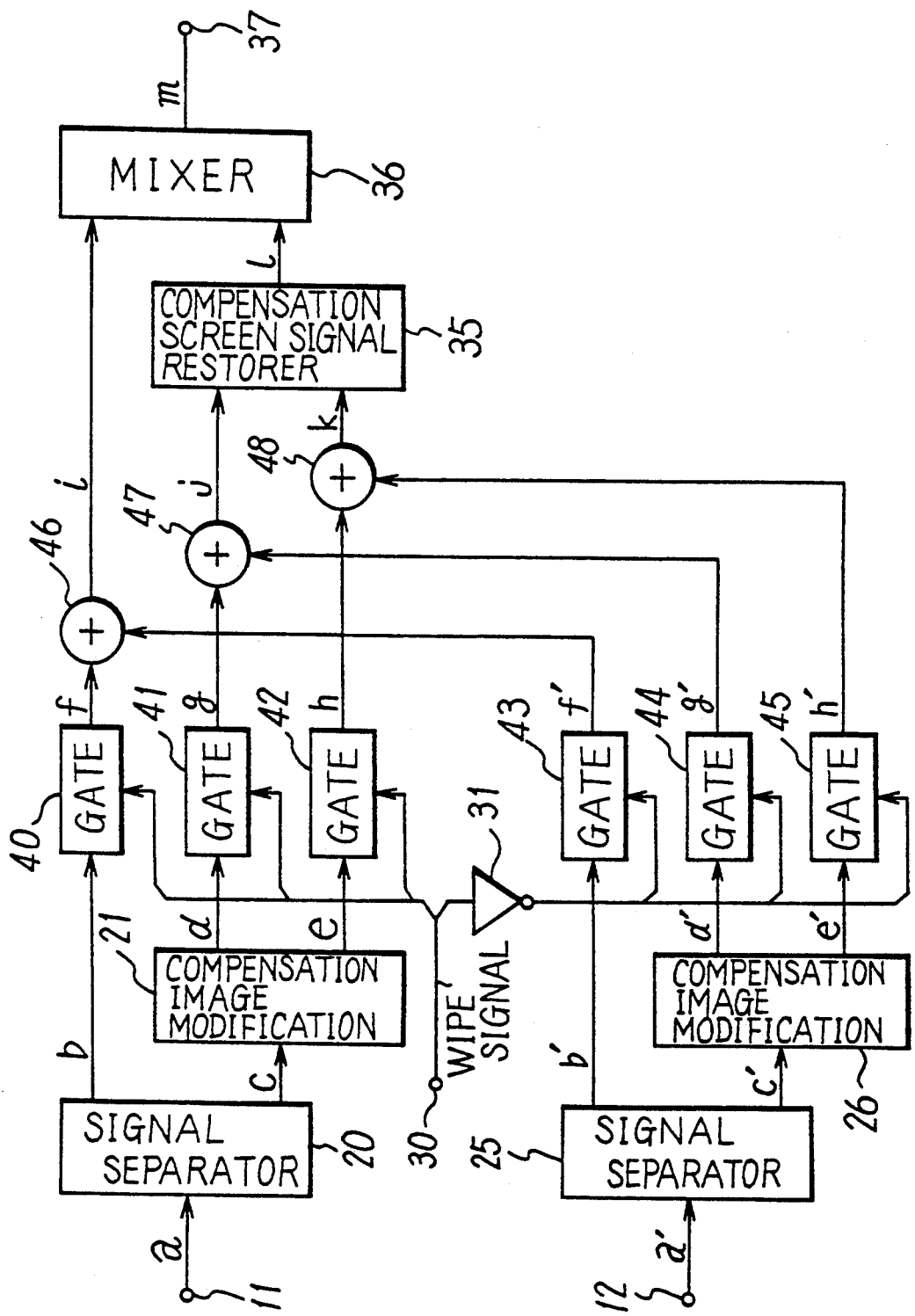
FIG. 4 shows a block diagram of another embodiment of the video switcher apparatus for the wide screen EDTV signals according to the present invention.
Figure 5:
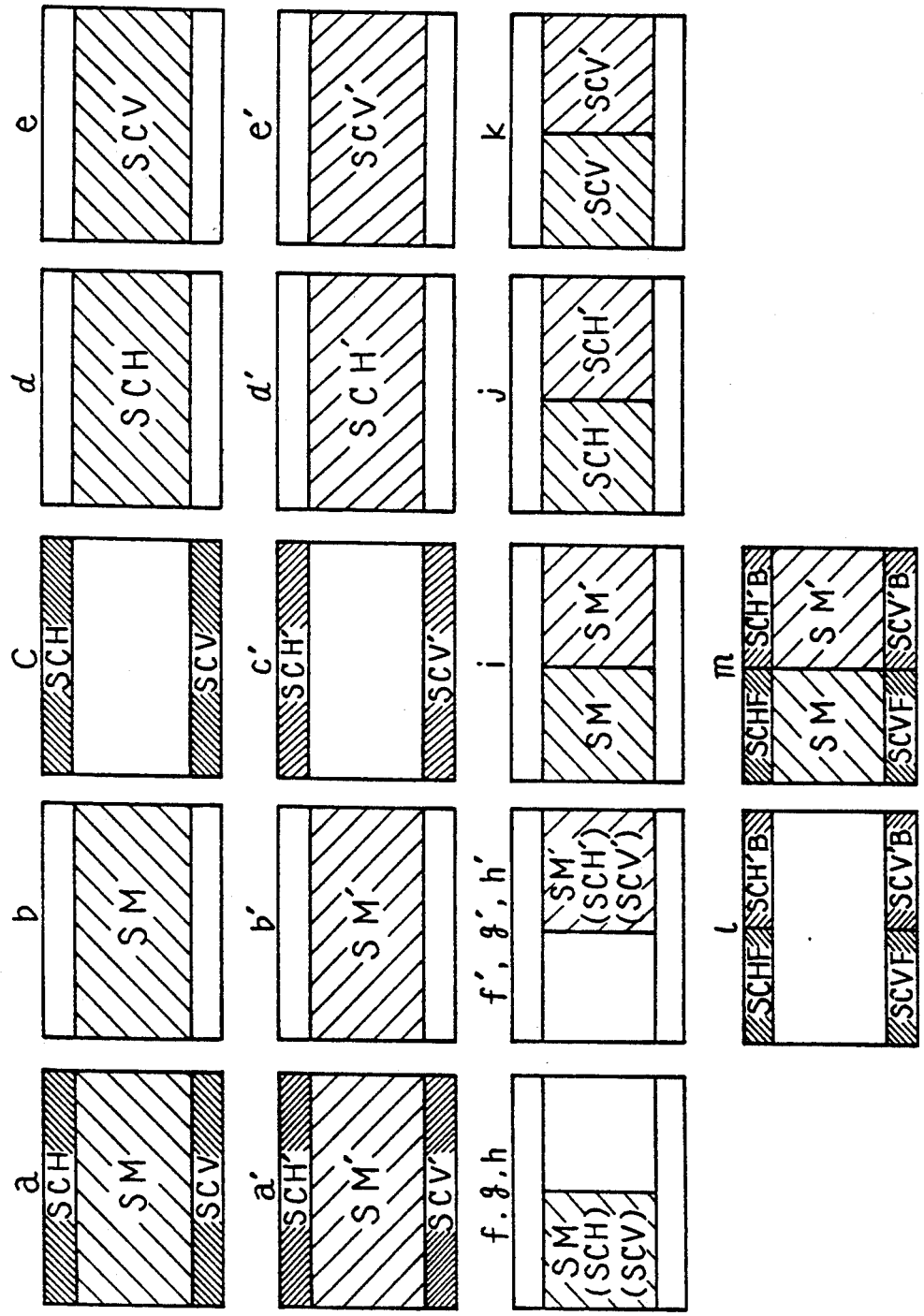
FIG. 5 shows the screens for explaining the video switching operation.

FIG. 4 shows another embodiment of the present invention wherein the mixed EDTV signal is produced after the wipe operation without the frequency multiplex process. The same blocks which are the same as those in FIG. 1 will not be further discussed. FIG. 5 shows the video switching models.

The EDTV signal "a" applied to the terminal 11 will be processed as follows: A gate circuit 40 receives the main screen signal "b" separated from the EDTV signal "a" and gate circuits 41 and 42 receive the compensation screen signals "d" and "e" whose spacial positions and sizes are equal to the main screen. Similarly, a gate circuit 43 receives the main screen signal "b'" separated from the EDTV signal "a'" and gate circuits 44 and 45 receive the compensation screen signals "d'" and "e'" whose spacial positions and sizes are equal to the main screen.

The horizontal wipe signal is applied to the terminal 30. The gate circuits 40, 41 and 42 generate respectively the wiped main screen signal "f", the horizontal compensation screen signal "g" and the vertical compensation screen signal "h" that exist only in the left half of the screen as shown in FIG. 5. Similarly, the gate circuits 43, 44 and 45 of the other channel generate respectively the wiped main screen signal "f'", the horizontal compensation screen signal "g'" and the vertical compensation screen signal "h'" that exist only in the right half of the screen as shown in FIG. 5.

A mixer 46 mixes the main screen signals "f" and "f'" to produce the mixed main screen signal "i". A mixer 47 mixes the horizontal compensation screen signals "g" and "g'" to produce the mixed horizontal compensation screen signal "j". A mixer 48 mixes the vertical compensation screen signals "h" and "h'" to produce the mixed vertical compensation screen signal "k".

The compensation screen signal restorer circuit 35 receives the mixed horizontal compensation screen signal "j" and the mixed vertical compensation screen signal "k" and converts them into the signal "l" whose signal type is the same as the input signal. The signal mixer 36 mixes the converted compensation screen signal "l" and the mixed main screen signal "i" to produce the wiped EDTV signal "m" at the output terminal 37.

According to an signal process, the EDTV signal the same as the signal discussed in FIG. 1 can be produced. This EDTV signal has compatibility with the current type screen and can be displayed as high resolution wiped image on the wide screen.

The above described embodiments adjust a relationship between the main screen signal and the compensation screen signal by processing the EDTV signal. However, the above discussed process can be accomplished as shown in FIG. 6 without processing the EDTV signal.

Figure 6:
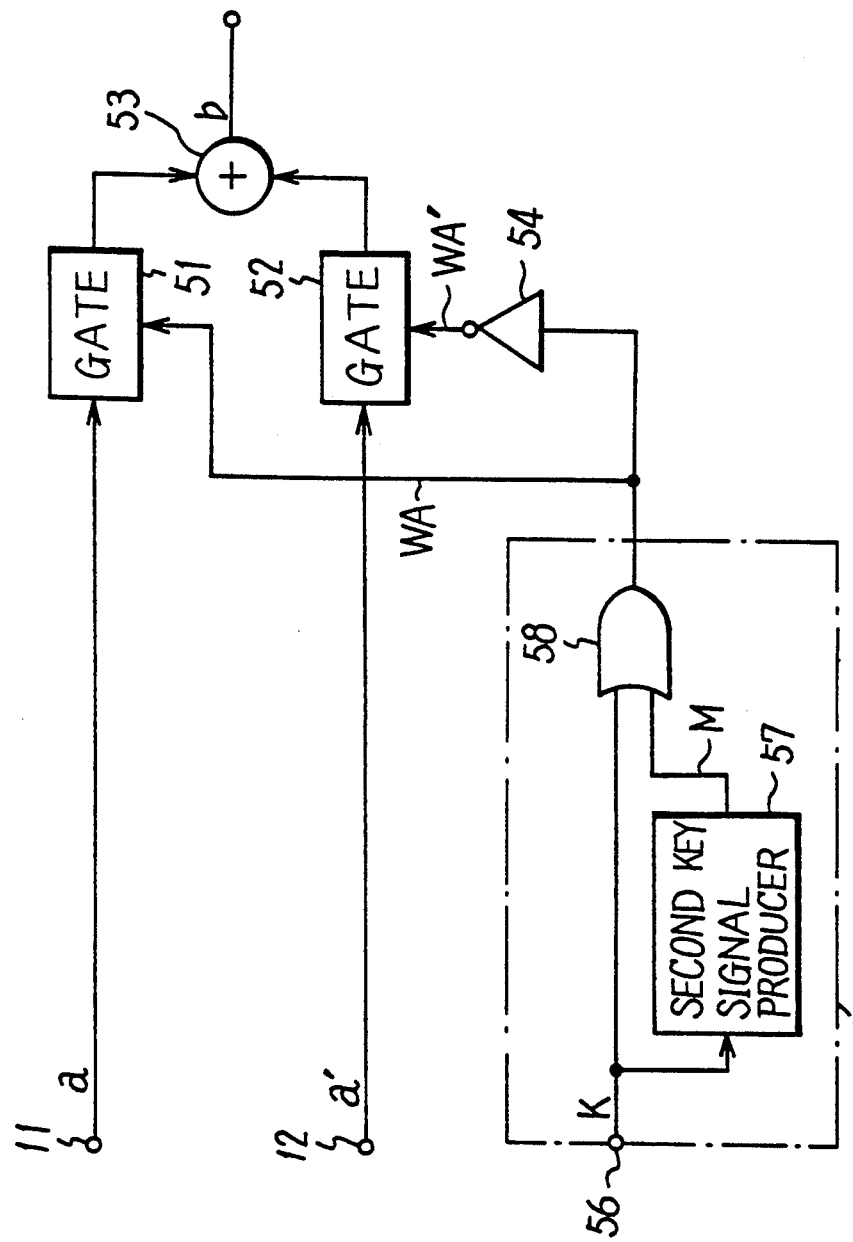
FIG. 6 shows a block diagram of the third embodiment of the video switcher apparatus for the wide screen EDTV signals according to the present invention.

In FIG. 6, gate circuits 51 and 52 are provided at channels of the transmission lines for the EDTV signal. A mixer 53 mixes the output signals from the gate circuits 51 and 52. A reference number 55 designates a wipe signal forming circuit for producing wipe signals WA and WA' (video switching signals). A reference number 54 refers to an inverter for generating a complement wipe signal.

Figure 7A:
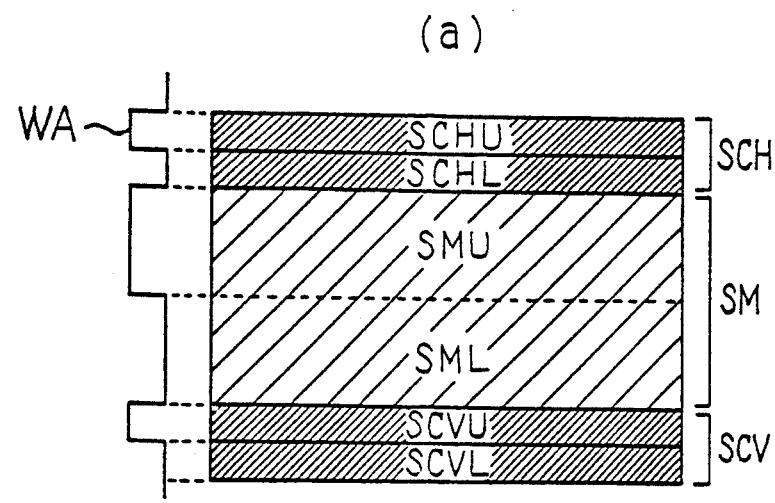
FIGS. 7A-7C show the screens for explaining the video switching operation.
Figure 7B:
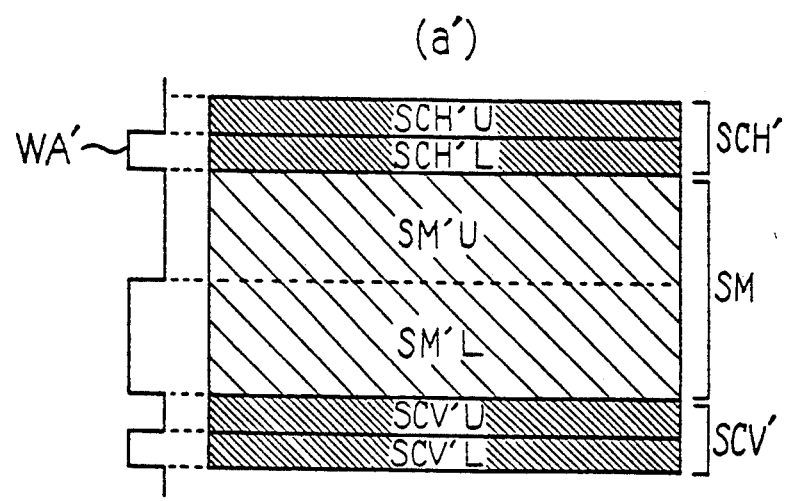
Figure 7C:
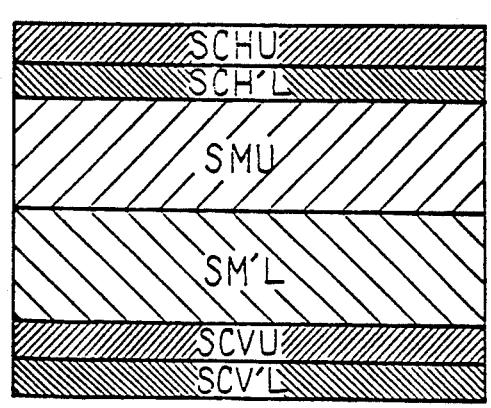
Figure 9A:
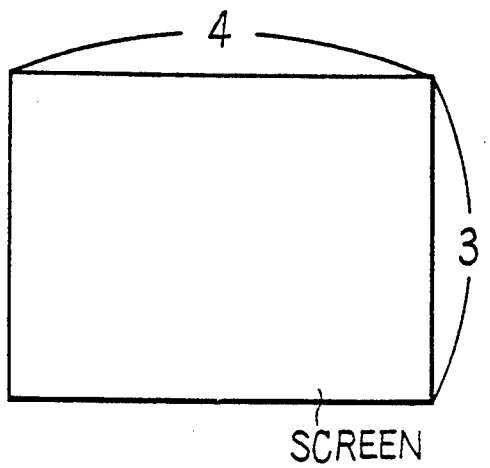
FIGS. 9A-9C show screens for explaining a relationship between a current type screen and a wide screen.
Figure 9B:
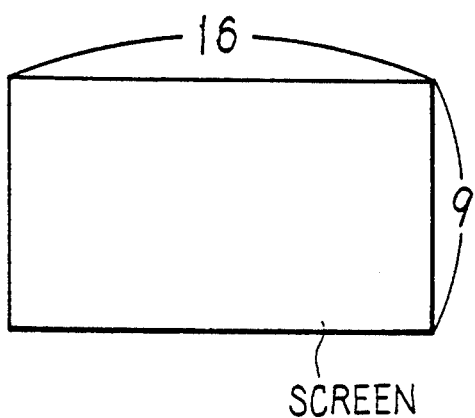
Figure 9C:
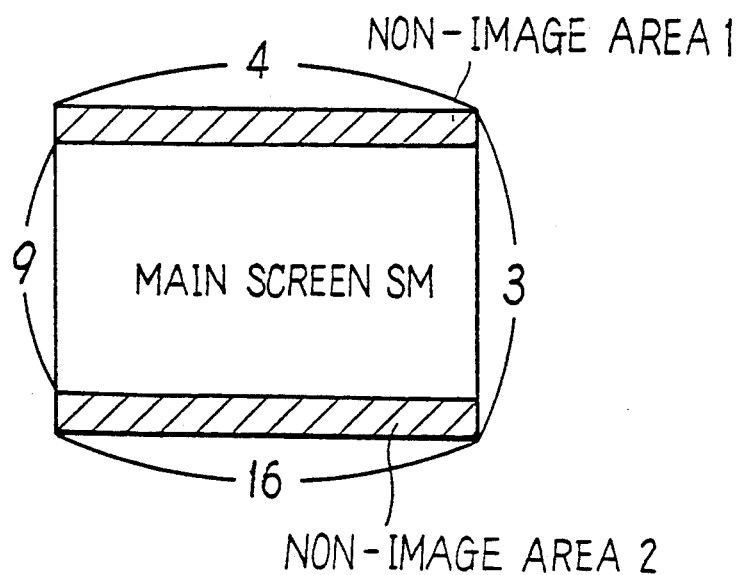
Figure 10:
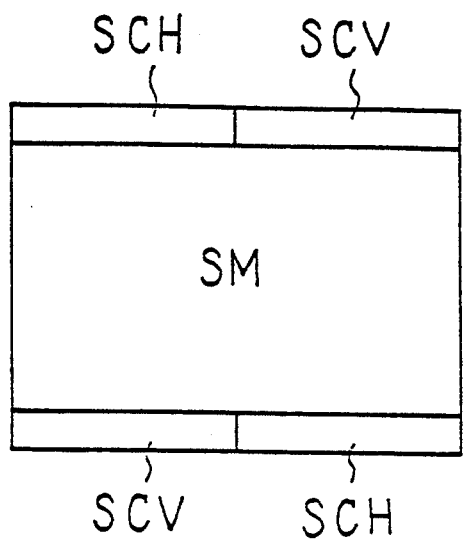
FIG. 10 shows a screen display example of a compatible wide screen EDTV signal.
Figure 11A:
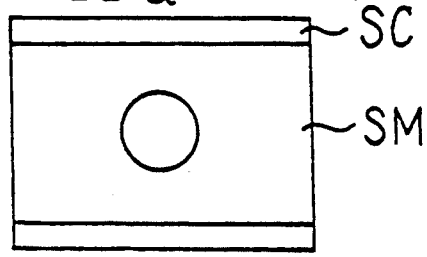
FIGS. 11A-11C show screens for explaining a special effect process.
Figure 11:
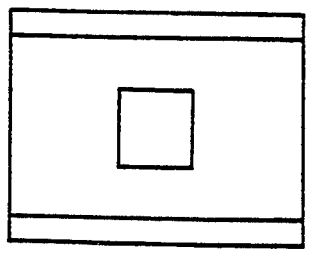
Figure 11:
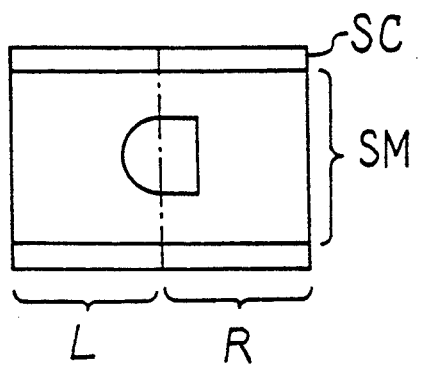
Figure 11:
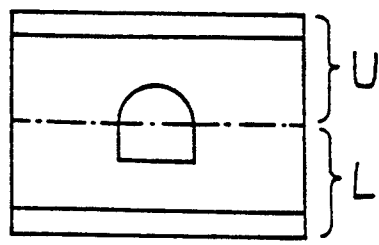
Figure 12:
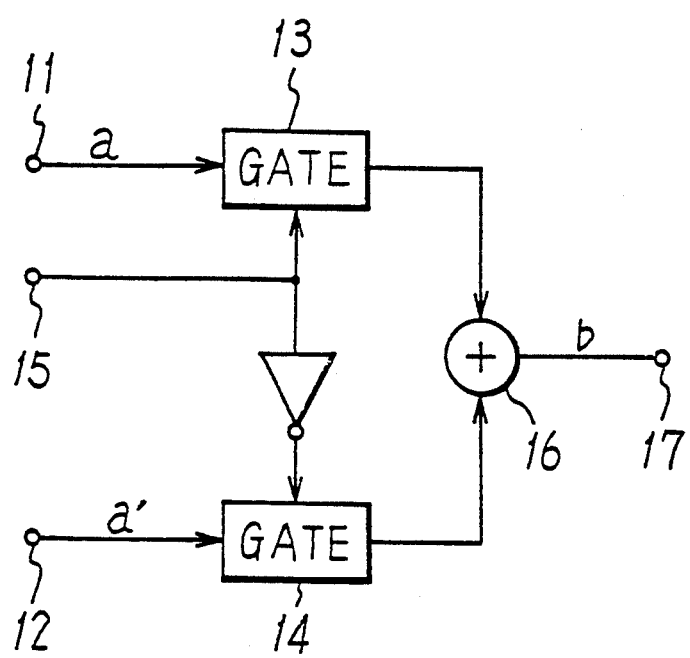
FIG. 12 shows a block diagram of a conventional video switcher apparatus.

FIG. 7 shows screens for explaining the video switching operation of the FIG. 6 circuit, and FIGS. 7A, 7B and 7C show the screen based on the EDTV signal "a".

An example of the vertical wipe process will be described in order to simplify the explanation. The main screen signal SM consists of the main screen signals SMU and SML for the upper and lower screen portions. Similarly, the horizontal compensation screen signal SCH consists of the horizontal compensation screen signals SCHU and SCHL for the upper and lower screen portions.

One horizontal compensation screen signal SCHU compensates the horizontal high frequency components of the image formed by the main screen signal SMU. The other horizontal compensation screen signal SCHL compensates the horizontal high frequency components of the image formed by the main screen signal SML. The vertical compensation screen signals SCVU and SCVL relate similarly to the horizontal compensation screen signals.

The vertical compensation screen signal SCV consists of the vertical compensation screen signals SCVU and SCVL that form the upper and lower portions of the screen. The EDTV signal "a'" applied to the other channel is similar to the EDTV signal "a" and the signal construction thereof is shown in FIG. 7B.

Under the above discussed screen configuration, the wipe signal WA shown in FIG. 7A is used to gate the EDTV signal "a" and the wipe signal WA' shown in FIG. 7B is used to gate the EDTV signal "a'". In this instance, the EDTV signal "a" applied to one channel is gated to produce the upper half signals (SMU, SCHU and SCVU) of the main screen signal SM and the compensation screen signal SC in response to the wipe signal WA.

Similarly, the EDTV signal "a'" applied to the other channel is gated to produce the lower half signals (SM'L, SCH'L and SCV'L) of the main screen signal SM and the compensation screen signal SC in response to the wipe signal WA'.

As a result, the wiped EDTV signal "b" can be derived as shown in FIG. 7C only by mixing the gated output signals of both the channels. The spacial position of the compensation screen signal with respect to the wiped main screen signal shown in FIG. 7C is equal to the screen position of the main screen signal. Thus, the EDTV signal of FIG. 7C can maintain the compatibility and can reproduce a high resolution image on the wide screen.

In order to execute the above discussed gating process by the wipe signal forming circuit 55 shown in FIG. 6, this circuit 55 comprises a second key signal producing circuit 57 and an OR gate 58. A terminal 56 receives a first key signal "K" (main key signal) corresponding to the main screen as shown in FIG. 8. This first key signal "K" is applied to the second key signal producing circuit 57 which produces a second key signal "M" corresponding to the non-image areas 1 and 2 as shown in FIG. 8. The OR circuit 58 executes a logic OR of the key signals "K" and "M" to produce the wipe signal WA shown in FIG. 8.

The construction of a second key signal producing circuit 57 is similar to the compensation screen signal restorer circuit 35 in FIG. 1. The circuit 57 generates the second key signal "M" that has a relation to the non-image areas 1 and 2 and has a gate waveform corresponding to the appointed wipe screen. The wipe signals WA and WA' can be generated by various means and a description thereof need not be set forth.

As discussed hereinbefore, the present invention matches the spacial position of the input signal (main and compensation screen signals) to be switched with that of the wipe signal. Thus, any desired special effect signal can be derived without using the decoder or the like.

In addition, according to a method of this invention, the video switcher apparatus can be constructed by employing conventional video signal switching technology. Since the mixed EDTV signal is not preprocessed for the non-interlace (sequential scanning), it is not necessary to consider the sequential scanning method for the construction of the video switcher apparatus. Thus, this invention is inexpensive.

Moreover, this invention matches the special position of the compensation screen signal with the main screen. Even if the main screen signal and the compensation screen signal are multiplexed in a frequency domain, they are multiplexed in different frequency bands. Thus, the main screen signal and the compensation screen signal do not interrupt each other, and the image quality is not reduced.

While preferred embodiments of the present invention have been shown and described herein, it will be apparent to those skilled in the art that many changes and modifications may be made without departing from the present invention in its broader aspect. For example, the wipe signal forming circuit shown in FIG. 6 can be used for the wipe signals used in FIGS. 1 and 4. The vertical wipe process was discussed in the embodiments; however the invention is not limited to the wipe waveform. The invention can be applied to a special effect process excluding the wipe process.

We claim:

1. A video switcher apparatus comprising:
   a plurality of signal separator means to which wide screen EDTV signals, each representing an image and each composed of a main screen signal and a compensation screen signal for compensating the high frequency components of said main screen signal, are supplied and separated into main screen signals and compensation screen signals;
   a plurality of compensation image modification means for returning compensation image signals to signals in original display positions with respect to said images represented by said EDTV signals, in which each of said compensation image signals as separated by a said respective signal separator means is received and returned to a signal in an original display position of the image;
   a plurality of frequency multiplex means for multiplexing said compensation image signals with said main image signals matched to a spacial position of the main screen signals by said returning to the original display position, wherein said main screen signals and said compensation image signals are multiplexed in frequency for providing a multiplexed EDTV signal;
   a signal switching means in which a plurality of EDTV signals multiplexed by the frequency multiplex means are suitably switched and then mixed; and
   a signal conversion means in which the switched and mixed EDTV signals are converted to wide screen EDTV signals.

2. A video switcher apparatus according to claim 1 wherein, in said compensation image modification means, the spacial position and size of the compensation screen signal are changed in the manner that a screen based on the compensation screen signal would match the main screen signal display position.

3. A video switcher apparatus according to claim 1 wherein said signal switching means is composed of gate circuits and a mixing circuit, wherein the gate circuits are controlled in response to a wipe signal.

4. A video switcher apparatus according to claim 1 wherein said signal conversion means comprises:
   a frequency separation means in which a mixed EDTV signal is separated in frequency to the main screen signal and a compensation screen signal;
   a compensation screen signal restoring means in which the compensation screen signal separated in frequency is restored to EDTV signal overlap position; and
   a mixing means in which the restored compensation screen signal and said main screen signal are mixed so as to form wide screen EDTV signals of the type of signal normally provided as input to said video switcher apparatus.

5. A video switcher apparatus comprising:
   a plurality of signal separator means to which wide screen EDTV signals, each representing an image and each composed of a main screen signal and a compensation screen signal for compensating the high frequency components of said main screen signal, are supplied and separated into main screen signals and compensation screen signals;
   a plurality of compensation image modification means for returning the compensation image signals to signals in original display positions with respect to said images represented by said EDTV signals, in which each of said compensation image signals as separated by said respective signal separator means is received and returned to a signal in an original display position of the image;
   signal gating and mixing means for simultaneously gating a plurality of main screen signals and compensation screen signals as matched in spacial position to the main screen signals by said returning to the original display position and for then separately mixing the main screen signals with one another and the compensation screen signals with one another;
   a compensation screen signal restoring means for receiving compensation screen signals from the gating and mixing means and restoring the compensation screen signals to original signal overlap positions; and
   a mixing means in which the restored compensation screen signals and said main screen signals are mixed so as to form wide screen EDTV signals of the type of signal normally provided as input to said video switcher apparatus.

6. A video switcher apparatus according to claim 5 wherein, in said signal gating and mixing means, gate circuits by which said main screen signal and compensation screen signals are switched respectively and individually are provided for each wide screen EDTV signal and wherein the outputs of the gate circuits are mixed for every main screen signal and compensation screen signal provided.

* * * * *